US011073990B2

(12) United States Patent
Wang et al.

(10) Patent No.: US 11,073,990 B2
(45) Date of Patent: Jul. 27, 2021

(54) DATA STORAGE DEVICE IDENTIFYING AN ELECTRONIC DEVICE TO A HARDWARE-SWITCHING DEVICE

(71) Applicant: Lenovo Enterprise Solutions (Singapore) Pte. Ltd., Singapore (SG)

(72) Inventors: Zhaoli Wang, Shanghai (CN); Qian QiaoNeng, Pudong Shanghai (CN); CheKim Chhuor, Shanghai (CN); Weiyi Xie, JiangSu (CN); Tang WenWei, Shanghai (CN)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 975 days.

(21) Appl. No.: 15/163,953

(22) Filed: May 25, 2016

(65) Prior Publication Data

US 2016/0364152 A1   Dec. 15, 2016

(30) Foreign Application Priority Data

Jun. 15, 2015   (CN) .......................... 201510330374.4

(51) Int. Cl.
  *G06F 3/06* (2006.01)
  *G06F 13/42* (2006.01)
  *G06F 13/40* (2006.01)

(52) U.S. Cl.
  CPC .......... *G06F 3/0607* (2013.01); *G06F 3/0632* (2013.01); *G06F 3/0679* (2013.01); *G06F 13/4022* (2013.01); *G06F 13/4282* (2013.01)

(58) Field of Classification Search
  CPC .... G06F 3/0607; G06F 3/0632; G06F 3/0679; G06F 13/4022; G06F 13/4282
  See application file for complete search history.

(56) References Cited

U.S. PATENT DOCUMENTS 8,234,419 B1 * 7/2012 Nasu ..................... G06F 3/0613
                                                      710/39
2004/0212485 A1 * 10/2004 Tajima ................... H04L 67/12
                                                      340/436

(Continued)

*Primary Examiner* — Henry Tsai
*Assistant Examiner* — Aurangzeb Hassan
(74) *Attorney, Agent, or Firm* — Jeffrey L. Streets

(57) ABSTRACT

A data storage device includes a memory used to store device identification information, wherein the data storage device is operable to communication with an electronic device to receive the device identification information sent from the electronic device and to store the device identification information in the memory, and wherein the data storage device is operable to provide a hardware-switching device with the device identification information from the memory. A method for identifying multiple electronic devices includes providing, for each electronic device, a corresponding data storage device communicating with a hardware-switching device and storing device identification information related to each electronic device in the corresponding data storage device. Furthermore, in relation to communication between the data storage device and the hardware-switching device, the hardware-switching device receiving corresponding device identification information, so as to identify a corresponding electronic device based on the device identification information received by the hardware-switching device.

20 Claims, 7 Drawing Sheets

(56) References Cited

U.S. PATENT DOCUMENTS

| | | | |
|---|---|---|---|
| 2005/0198247 A1* | 9/2005 | Perry | H04L 7/0008 709/223 |
| 2010/0318717 A1* | 12/2010 | Batish | G06F 3/023 710/316 |
| 2012/0042099 A1* | 2/2012 | Wong | G06F 21/606 710/9 |
| 2012/0099855 A1* | 4/2012 | Sasso | H04L 61/6045 398/25 |
| 2012/0158930 A1* | 6/2012 | Kalusivalingam | H04L 49/3009 709/223 |
| 2013/0170492 A1* | 7/2013 | Lu | H04L 61/6022 370/390 |
| 2014/0027771 A1* | 1/2014 | Satoh | G11C 5/025 257/48 |
| 2015/0052258 A1* | 2/2015 | Johnson | H04L 67/141 709/228 |
| 2015/0074323 A1* | 3/2015 | Chumbalkar | G06F 13/40 710/316 |
| 2015/0106660 A1* | 4/2015 | Chumbalkar | G06F 11/0727 714/42 |
| 2015/0302222 A1* | 10/2015 | Okabe | G06F 9/5077 726/17 |
| 2015/0356042 A1* | 12/2015 | Ochiai | G06F 13/4022 710/316 |
| 2016/0104101 A1* | 4/2016 | Lambert | G06Q 10/087 705/28 |
| 2016/0117268 A1* | 4/2016 | Griffin | G06F 13/102 710/10 |
| 2016/0179638 A1* | 6/2016 | Berry | G06F 11/1458 714/4.12 |
| 2016/0203471 A1* | 7/2016 | Zand | G06Q 20/341 705/41 |
| 2016/0226913 A1* | 8/2016 | Sood | H04L 67/10 |
| 2016/0291654 A1* | 10/2016 | Iyer | G05B 15/02 |
| 2017/0109310 A1* | 4/2017 | Takahashi | G06F 9/45545 |

\* cited by examiner

DATA STORAGE DEVICE IDENTIFYING AN ELECTRONIC DEVICE TO A HARDWARE-SWITCHING DEVICE

CROSS-REFERENCE TO RELATED APPLICATIONS

This application claims priority under 35 U.S.C. § 119 to Chinese Patent Application No. 2015103303744 filed Jun. 15, 2015, the entire text of which is specifically incorporated by reference herein.

BACKGROUND

Field of the Invention

Embodiments of the present invention relate to device management, and in particular, to a data storage device for identifying an electronic device, and a corresponding method thereof.

Background of the Related Art

As computer technologies and network technologies develop, more and more data centers have appeared. A data center generally has servers deployed therein, and the servers (such as computing servers and data storage servers) are used to provide various services. To save space, these servers are generally blade servers mounted in a cabinet.

In addition, the servers are used as data nodes in the data center, and it is not always necessary to control each server with a peripheral device (such as a keyboard, a mouse and a display). Instead, the servers may be controlled only when needed. Therefore, it is unnecessary to provide separate peripheral devices for each server in the data center, but multiple servers may be connected to a dedicated Keyboard Video Mouse (KVM) Switch, and selected servers may be controlled using peripheral devices, such as a keyboard, a mouse and a display, connected to the KVM switch.

The KVM switch may provide a large number of data interfaces (such as 8 interfaces and 32 interfaces), for example, an 8-interface KVM switch may be directly connected to 8 servers, thereby controlling the 8 servers. To increase the number of servers controllable by a KVM switch, a conversion cable dedicated to the KVM switch may further be used, and multiple servers may be connected to one interface of the KVM switch in a daisy chain scheme.

A data center typically has a large number of servers, for example, a rack may accommodate dozens of servers. Without using the daisy chain connection, one server may be connected to one interface in the KVM switch. However, when the daisy chain connection is used, multiple servers may be connected to one interface of the KVM switch. In this later case, facing the complicated connection relations, a manager of the data center must know in advance to which interface in the KVM switch a selected server is currently connected, before performing the next control operation.

BRIEF SUMMARY

One embodiment of the present invention provides a data storage device for storing device identification information of an electronic device. The data storage device comprises a memory used for storing device identification information, wherein the data storage device is operable to communicate with an electronic device to receive the device identification information sent from the electronic device and to be stored in the memory, and to communicate with a hardware-switching device, so that the hardware-switching device receives the device identification information from the memory.

Another embodiment of the present invention provides an electronic device, comprising a controller, and the data storage device according to the present invention, wherein the controller is operable to write the device identification information related to the electronic device into the memory of the data storage device.

Yet another embodiment of the present invention provides a hardware-switching device, comprising: a controller; and the data storage device according to the present invention, wherein the controller is operable to acquire device identification information from the memory of the data storage device, so as to identify an electronic device communicating with the data storage device based on the acquired device identification information.

A further embodiment of the present invention provides a method for identifying multiple electronic devices. The method comprises providing a corresponding data storage device operable to communicate with a hardware-switching device for each of the multiple electronic devices, storing device identification information related to each electronic device in the corresponding data storage device, and in relation to communication between some or all of the data storage devices and the hardware-switching device, the hardware-switching device receiving corresponding device identification information from some or all of the data storage devices, so as to assist in identifying corresponding electronic devices based on the device identification information received by the hardware-switching device.

BRIEF DESCRIPTION OF THE SEVERAL VIEWS OF THE DRAWINGS

In order for the advantages of the various embodiments to be readily understood, a more particular description of the various embodiments briefly described above will be provided by reference to specific exemplary embodiments that are illustrated in the accompanying drawings, which depict only exemplary embodiments and are not to be considered to be limiting in scope. The various embodiments are to be described and explained with additional specificity and detail through the use of the accompanying drawings.

DETAILED DESCRIPTION

Figure 1:
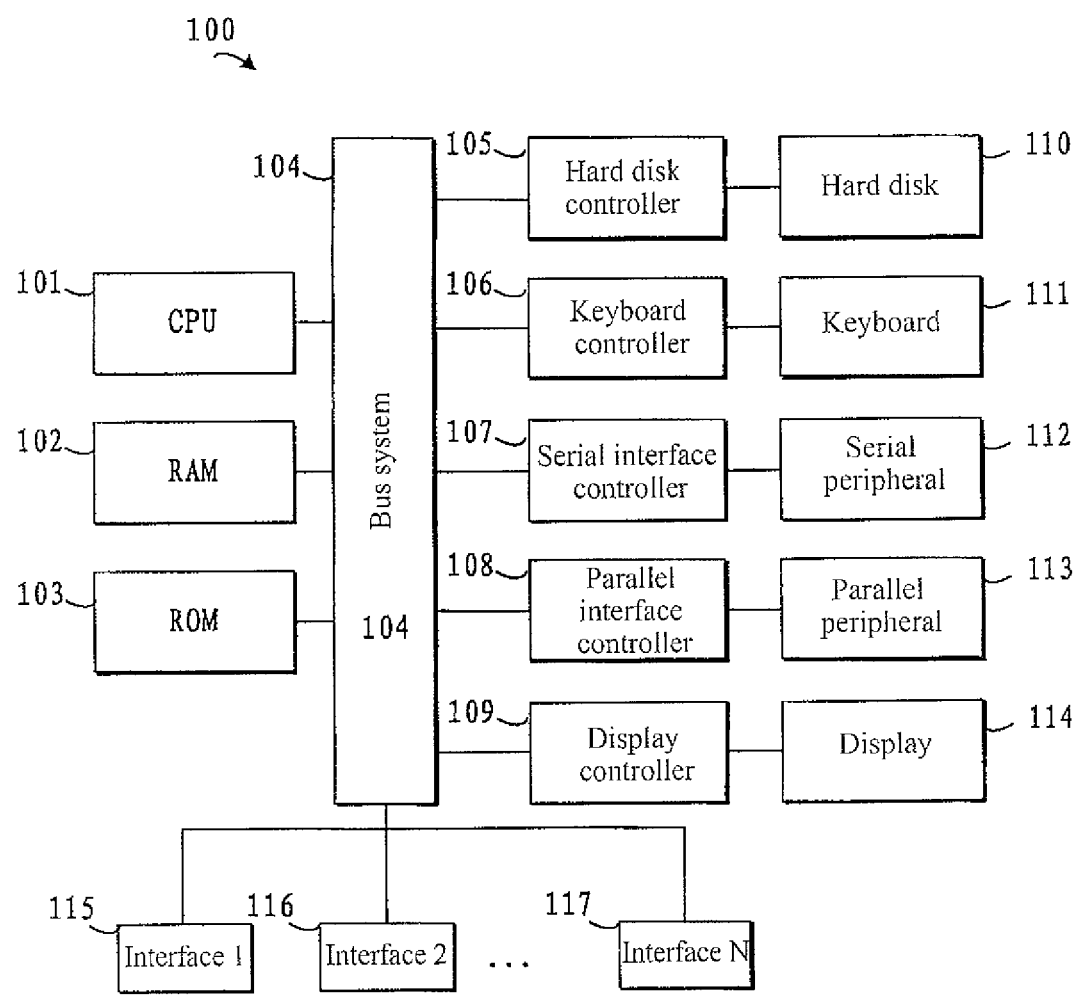
FIG. 1 is a schematic block diagram of an exemplary hardware-switching device capable of implementing an embodiment of the present invention.

One embodiment of the present invention provides a data storage device for storing device identification information of an electronic device. The data storage device comprises a memory used for storing device identification information, wherein the data storage device is operable to communicate with an electronic device to receive the device identification information sent from the electronic device and to be stored in the memory, and to communicate with a hardware-switching device, so that the hardware-switching device receives the device identification information from the memory.

Another embodiment of the present invention provides an electronic device, comprising a controller, and the data storage device according to the present invention, wherein the controller is operable to write the device identification information related to the electronic device into the memory of the data storage device.

Yet another embodiment of the present invention provides a hardware-switching device, comprising: a controller; and the data storage device according to the present invention, wherein the controller is operable to acquire device identification information from the memory of the data storage device, so as to identify an electronic device communicating with the data storage device based on the acquired device identification information.

A further embodiment of the present invention provides a method for identifying multiple electronic devices. The method comprises providing a corresponding data storage device operable to communicate with a hardware-switching device for each of the multiple electronic devices, storing device identification information related to each electronic device in the corresponding data storage device, and in relation to communication between some or all of the data storage devices and the hardware-switching device, the hardware-switching device receiving corresponding device identification information from some or all of the data storage devices, so as to assist in identifying corresponding electronic devices based on the device identification information received by the hardware-switching device.

Embodiments of the present invention identify an electronic device more conveniently and efficiently by writing, into a data storage device, identification information associated with the electronic device that is expected to be controlled, so that a hardware-switching device may use the device identification information to identify which electronic device is currently being operated. Therefore, a manager of a data center can perform a subsequent control operation on the identified device.

Various embodiments of the present invention are described in more details with reference to the accompanying drawings. However, it should be understood that the present invention may be implemented in various forms, and is not be limited by the embodiments described herein. Rather, the embodiments described herein are provided to make the disclosure more thorough and complete, as will be understood by persons skilled in the art.

FIG. 1 is a block diagram of an exemplary hardware-switching device 100 capable of implementing an embodiment of the present invention. The hardware-switching device 100 may be, for example, the KVM switch described above, and may have multiple interfaces (for example, an "Interface 1" 115, an "Interface 2" 116, and so on through an "Interface N" 117) used to be connected to multiple electronic devices, where each interface may be connected to one electronic device. Alternatively, when a daisy chain connection is used, one interface may be connected to multiple electronic devices. Moreover, as shown in FIG. 1, a computer system 100 may comprise a CPU (central processing unit) 101, RAM (random access memory) 102, ROM (read only memory) 103, a system bus 104, a hard disk controller 105, a keyboard controller 106, a serial interface controller 107, a parallel interface controller 108, a display controller 109, a hard disk 110, a keyboard 111, a serial peripheral device 112, a parallel peripheral device 113, and a touch screen display 114. In these devices, the CPU 101, RAM 102, ROM 103, the hard disk controller 105, the keyboard controller 106, the serial interface controller 107, the parallel interface controller 108 and the display controller 109 are coupled to the system bus 104. The hard disk 110 is coupled to the hard disk controller 105, the keyboard 111 is coupled to the keyboard controller 106, the serial peripheral device 112 is coupled to the serial interface controller 107, the parallel peripheral device 113 is coupled to the parallel interface controller 108, and the touch screen display 114 is coupled to the display controller 109. It should be noted that, the structural block diagram shown in FIG. 1 is merely an example, and is not intended to limit the scope of the present invention. In some cases, some devices may be added or omitted according to specific situations.

Figures 2A, 2B:
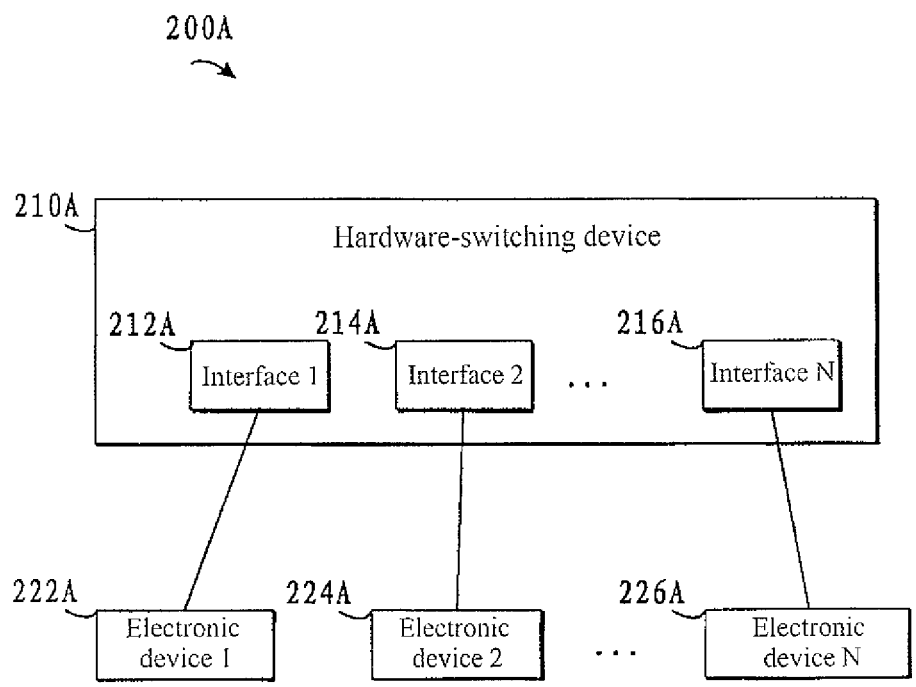
FIG. 2A is a schematic block diagram of one embodiment of a hardware-switching device used for controlling an electronic device.
FIG. 2B is a schematic block diagram of a control interface used for controlling an electronic device.

FIG. 2A is a schematic block diagram 200A illustrating a manner of connecting a hardware-switching device to multiple electronic devices. A hardware-switching device 210A shown in FIG. 2 may be, for example, the above-mentioned KVM switch, and may have multiple interfaces used to be connected to multiple electronic devices. In this example, an Interface 1 212A may be connected to an Electronic device 1 222A, an Interface 2 214A may be connected to an Electronic device 2 224A, and continuing in this manner, such that an Interface N 216A may be connected to an electronic device N 226A.

In a conventional data center, a label for identifying an electronic device may be adhered to a cable between each interface of the hardware-switching device 210A and a corresponding electronic device. When a manager of the data center operates the hardware-switching device 210A, the manager may determine a connection relation between each interface of the hardware-switching device 210A and each electronic device by reading the label adhered to the cable, thereby determining to which interface of the hardware-switching device 210A an electronic device selected to be controlled is connected.

FIG. 2B is a schematic block diagram 200B of a control interface used for controlling an electronic device according to one embodiment of the present invention. In this embodiment, a data table (as shown in FIG. 2B) of connection relations between the electronic devices and the interfaces may be further stored in the hardware-switching device 210A, so that the data center manager can look up the connection relations of the interfaces and the electronic devices through the data table. However, the manager of the data center may have pulled out a cable connected to an electronic device and connected the cable to another electronic device, such that the data table shown in FIG. 2B must be modified manually. Otherwise, confusion of relations between the electronic devices and the interfaces may be caused, thereby causing the data center manager to make an operation error.

Currently, the connection relation between the electronic device and each interface of the hardware-switching device may be determined by using the above-mentioned manual methods. However, these methods cannot automatically identify electronic devices and require a large amount of manual labor by the data center manager, and may further cause potential risks.

Figure 3:
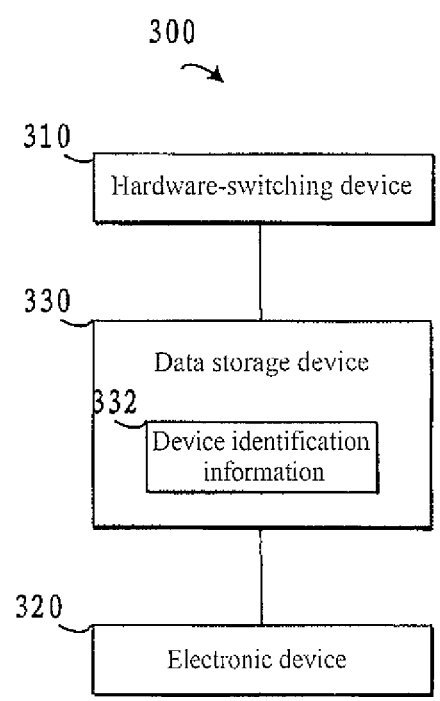
FIG. 3 is a schematic diagram of a data storage device for identifying an electronic device to a hardware-switching device according to an embodiment of the present invention.

Accordingly, embodiments of the present invention provide a data storage device for automatically identifying an electronic device. Specifically, FIG. 3 is a schematic diagram 300 of a hardware-switching device used for controlling an electronic device according to an embodiment of the present invention. In the embodiment shown in FIG. 3, a data storage device 330 is connected between a hardware-switching device 310 and an electronic device 320, and the data storage device 330 may be a data storage such as a flash memory, or the data storage device 330 may further be implemented by using other data storage technologies.

In this embodiment, device identification information 332 capable of identifying the electronic device 320 may be stored in the data storage device 330, and when the hardware-switching device 310 and the electronic device 320 are connected together with the data storage device 330, the hardware-switching device 310 may first read the device identification information 332 from the data storage device 330. In this case, the data center manager may determine which electronic device is being controlled by the hardware-switching device 310 based on the device identification information 332 read from the data storage device 330, so that the data center manager may perform a subsequent control operation.

The hardware-switching device 310 may have multiple interfaces used to be connected to different electronic devices. However, during operation of the hardware-switching device 310, the hardware-switching device 310 can merely switch to one electronic device and control the electronic device at the same time. In other words, although different interfaces of the hardware-switching device 310 may be simultaneously connected to different electronic devices, only one interface among all of the interfaces is in an "activated" state to support the hardware-switching device 310 in controlling a connected electronic device through the "activated" interface. In this embodiment, device identification information of the electronic device connected to the "activated" interface may be displayed on a display connected to the hardware-switching device 310.

In an embodiment of the present invention, a data storage device is provided for storing device identification information of an electronic device. The data storage device comprises a memory used for storing device identification information, wherein the data storage device is operable to communicate with an electronic device, to receive the device identification information sent from the electronic device, and to store the device identification information in the memory. In addition, the data storage device is operable to communicate with a hardware-switching device, so that the hardware-switching device receives the device identification information from the memory.

In this embodiment, to support the hardware-switching device automatically identifying an electronic device connected thereto, the data storage device comprising the memory may be provided, and information identifying the electronic device is stored in the memory. When the data storage device is in communication with the electronic device, the electronic device writes its device identification information into the memory of the data storage device. Accordingly, when the data storage device communicates with the hardware-switching device, the hardware-switching device receives the device identification information. Then, the hardware-switching device may identify the information related to the electronic device according to the received device identification information.

A person skilled in the art should understand that, in this embodiment, the data storage device may have a data interface used to be connected to the hardware-switching device and a data interface used to be connected to the electronic device. In an embodiment, the data storage device has a first data interface and a second data interface, where the first data interface is operable to be connected to the electronic device for communication, and the second data interface is operable to be connected to the hardware-switching device for communication.

Figure 4:
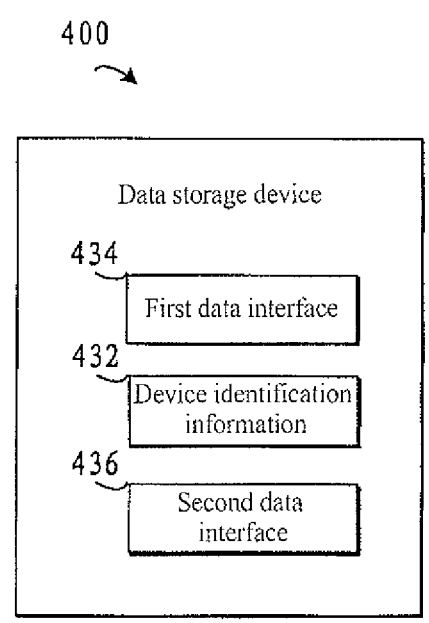
FIG. 4 is a schematic diagram of a data storage device according to an embodiment of the present invention.

FIG. 4 is a schematic diagram of a data storage device 400 according to an embodiment of the present invention. FIG. 4 shows the specific structure of the data storage device 330 in FIG. 3. In this embodiment, the data storage device 400 may comprise a first data interface 434 that may be used to be operatively connected to the electronic device (for example, the electronic device 320 shown in FIG. 3), and a second data interface 436 that may be used to be operatively connected to the hardware-switching device (for example, the hardware-switching device 310 shown in FIG. 3).

In an embodiment of the present invention, the first data interface and the second data interface may be implemented by using various data interface standards supporting switching between devices. For example, a universal serial bus (USB) interface standard may be used in order to be compatible with various existing devices. In this case, the data storage device according to the present invention may be a flash memory having two USB interfaces at each of two ends.

In an embodiment of the present invention, the memory is operable to respond to any of the following occurrences and then to store the device identification information, wherein the occurrences may include the electronic device being started, and the device identification information of the electronic device being updated.

Specifically, the electronic device may write the device identification information of the electronic device into the memory of the data storage device. For example, in a case that the data storage device is connected to the electronic device, the device identification information may be written into the memory in response to the electronic device starting. The device identification information may be written into the memory of the data storage device each time when the electronic device is started, or a writing operation is executed when the device identification information of the electronic device is updated. During operation of the electronic device, the data center manager may update configuration information of the electronic device, for example, modifying information of the electronic device, such as a name and an IP address, which may cause a change in the device identification information of the electronic device, and therefore, writing is executed when the device identification information of the electronic device is updated, so as to ensure that the device identification information stored in the memory of the data storage device is the latest information.

In an embodiment of the present invention, the electronic device may write the device identification information of the electronic device into the memory of the data storage device when the hardware-switching device switches to the electronic device.

In an embodiment of the present invention, an electronic device may be provided, wherein the electronic device comprises a controller and the data storage device according to the present invention, wherein the controller is operable to write the device identification information related to the electronic device into the memory of the data storage device.

In this embodiment, a manufacturer of the electronic device may provide, in the electronic device, the data storage device according to the present invention. Specifically, the electronic device may include the data storage device. In other words, the data storage device may be embedded into the electronic device and serve as a part of the electronic device. In this way, a controller of the electronic device may write, in response to starting the electronic device or in response to updating the device identification information of the electronic device, the device identification information of the electronic device into the memory of the data storage device.

In an embodiment of the present invention, the data storage device comprises a first data interface, and the electronic device further comprises a corresponding data interface connected to the first data interface of the data storage device and is configured for communication. In this embodiment, the electronic device may have a corresponding data interface, so as to connect the first interface of the data storage device to the electronic device, thereby performing communication between the electronic device and the data storage device.

In an embodiment of the present invention, the device identification information comprises system information of the electronic device, wherein the system information includes at least any one or more of the following: a system name, a product name, a system type, a serial number, and an IP address. Specifically, FIG. 5 schematically shows exemplary configuration information according to an embodiment of the present invention.

Figure 5:
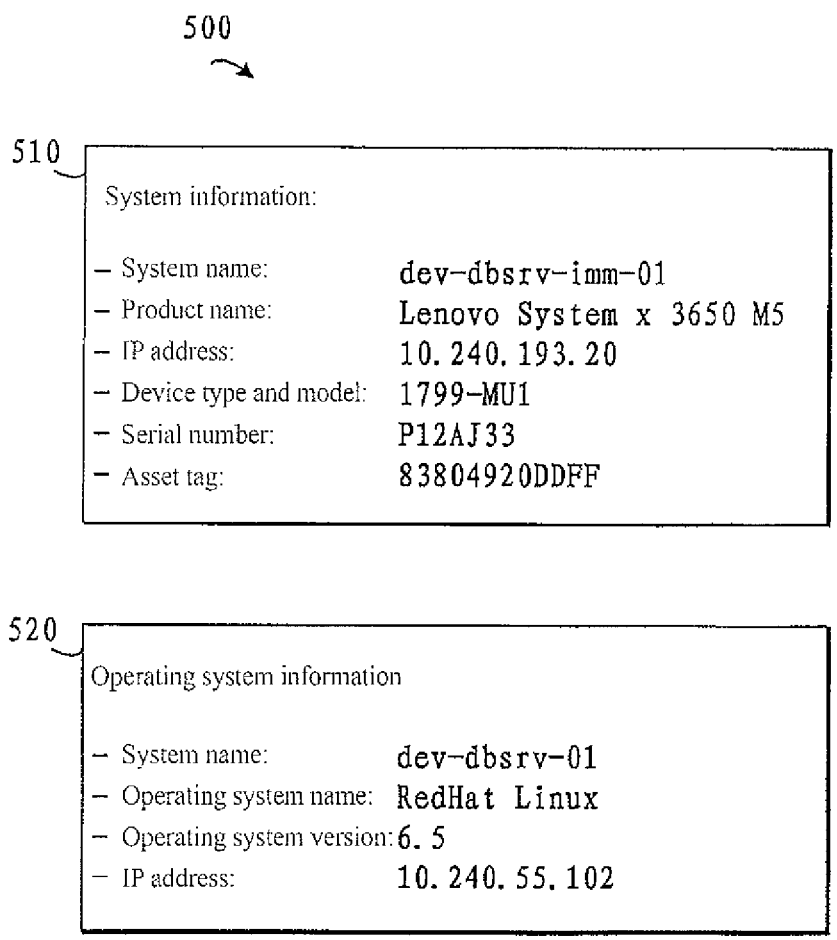
FIG. 5 schematically shows exemplary configuration information according to different embodiments of the present invention.

As shown by system information 510 in FIG. 5, the device identification information may be any information that can distinguish one electronic device from other electronic devices. For example, the system information may include any one or more of a system name, a product name, a system type, a serial number and an IP address. It should be noted that the system information shown in FIG. 5 is merely an example, and in an embodiment of the present invention, a person skilled in the art may use other information to serve as the device identification information of the electronic device according to requirements of a specific application environment, as long as the manager of the data center can identify which electronic device is being operated based on the device identification information.

Furthermore, in an embodiment of the present invention, the device identification information may further comprise information of an operating system installed in the electronic device, and the information of the operating system may include at least one of the following: a name of the operating system, a version of the operating system, a level name an operating system, and an IP address of an operating system level. As shown by operating system information 520 in FIG. 5, in addition to the system information shown by 510, information related to the operating system may further be provided, for example, including, but not limited to, any one or more of a name of the operating system, a version of the operating system, a level name the operating system, and an IP address of the operating system level.

A person skilled in the art should understand that one or more operating systems may be installed in one electronic device, and therefore, the operating systems may each have respective configuration information. The information related to the operating systems may be further provided to the data center manager, so that the manager may have access to further information about the electronic device being operated.

In an embodiment of the present invention, a hardware-switching device is provided, comprising a controller and the data storage device according to the present invention, where the controller is operable to acquire device identification information from a memory of the data storage device, so as to identify an electronic device communicating with the data storage device based on the acquired device identification information.

In this embodiment, a manufacturer of the hardware-switching device may provide the data storage device according to the present invention in the hardware-switching device. Specifically, the hardware-switching device may comprise the data storage device. In other words, the data storage device may be embedded into the hardware-switching device and serve as a part of the hardware-switching device. In this way, a controller of the hardware-switching device may acquire the device identification information from the memory of the data storage device, and identify the electronic device that is communicating with the data storage device based on the acquired device identification information, in response to the electronic device identified by the stored device identification information being connected to the hardware-switching device through the data storage device.

In an embodiment of the present invention, the data storage device comprises a second data interface, and the hardware-switching device further comprises a corresponding data interface connected to the second data interface of the data storage device and is configured for communication. In this embodiment, the hardware-switching device may have a corresponding data interface, so as to connect the second interface of the data storage device to the hardware-switching device, thereby performing communication between the hardware-switching device and the data storage device.

In an embodiment of the present invention, the data storage device is operable to respond to any of the following occurrences and then to store the device identification, wherein the occurrences include the electronic device being started, and the device identification information of the electronic device being updated. In the above, specific details of how to store the device identification information have been disclosed above in reference to the embodiment of the data storage device.

In an embodiment of the present invention, the device identification information comprises system information of the electronic device, and the system information comprises at least one of the following: a system name, a product name, a system type, a serial number, and an IP address. In an embodiment of the present invention, the device identification information further comprises information of an operating system installed in the electronic device, and the information of the operating system comprises at least one of the following: a name of the operating system, a version of the operating system, a level name of an operating system, and an IP address of an operating system level. The specific content of the device identification information has been described with the above-mentioned reference to FIG. 5, and will not be repeated hereafter.

In an embodiment of the present invention, the hardware-switching device is operable to control the electronic device communicating with the data storage device. In this embodiment, the hardware-switching device is connected to the electronic device through the data storage device, and when the hardware-switching device has acquired the device identification information of the electronic device and has identified which electronic device is being operated, the data storage device functions as a connection cable. In other words, it may be considered in this case that the memory in the data storage device is bypassed, such that the first data interface and the second data interface of the data storage device are effectively connected directly, and the data storage device after completing the identification step merely acts as a connection cable between the hardware-switching device and the electronic device.

Figure 6:
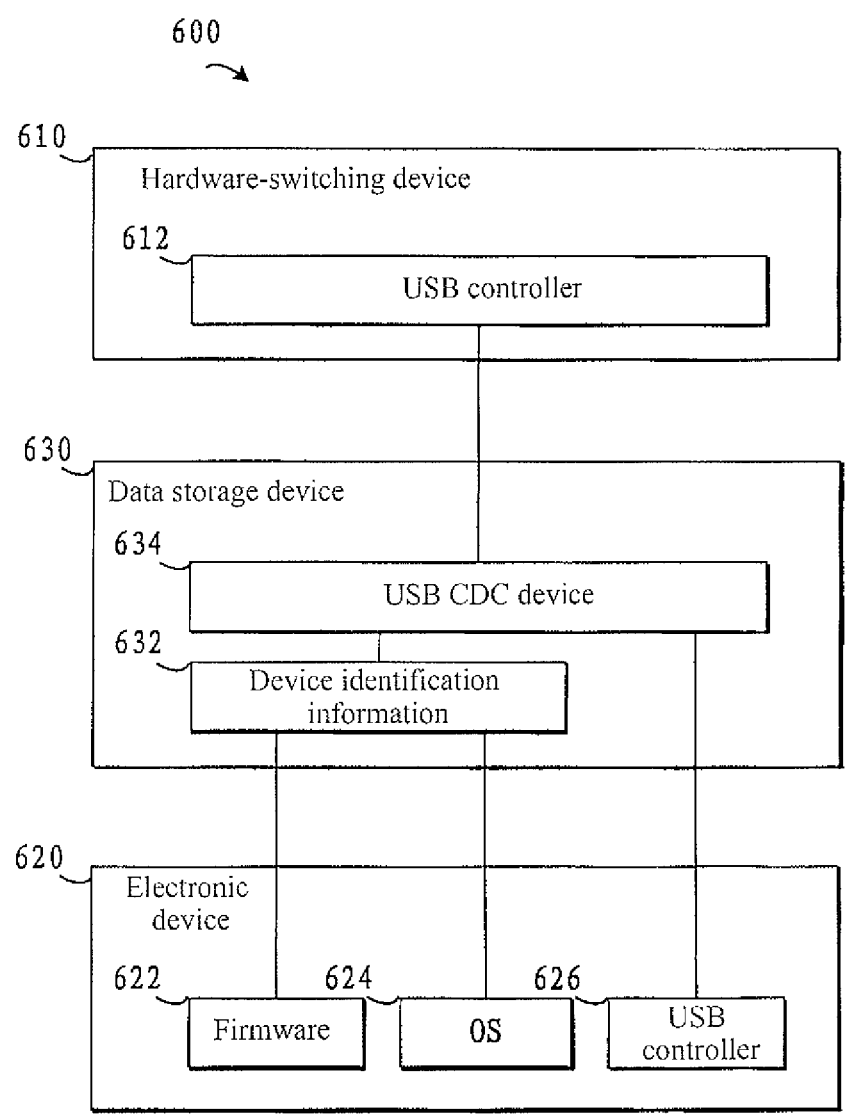
FIG. 6 is a detailed schematic diagram of a data storage device for identifying an electronic device to a hardware-switching device according to an embodiment of the present invention.

Working principles of an embodiment of the present invention are described in detail with reference to FIG. 6. Specifically, FIG. 6 is a schematic diagram 600 including a hardware-switching device 610 controlling an electronic device 620 according to an embodiment of the present invention. As shown in FIG. 6, a data storage device 630 may be first connected to the electronic device 620 (for example, through a first data interface in the data storage device 620). After the connection, the electronic device 620 may write device identification information 632 into a memory of the data storage device 630.

When the device identification information 632 involves different content of the electronic device 620, different functional units of the electronic device 620 may support the writing of corresponding device identification information into the memory. For example, when the device identification information involves system information of the electronic device, a firmware unit 622 in the electronic device 620 may be used to support collection and writing of the device identification information. When the device identification information involves information of an operating system of the electronic device 620, connection and writing of the device identification information may be implemented by using an operating system 624 installed in the electronic device 620.

In a case that the data interface is a USB interface, a USB controller 626 in the electronic device 620 may be used to assist execution. The data storage device 630 may be provided with a USB communication device class (CDC) device, so as to manage an operation associated with writing the device identification information 632 into the data storage device 630.

By means of the process shown above, when the data storage device 630 is connected to the electronic device 620, the device identification information 632 associated with the electronic device 620 may be written into the data storage device 630. It should be noted that, in the above process of writing data to the data storage device 630, it is not required that the data storage device 630 be connected to the hardware-switching device 610, and it is only needed to establish a connection between the data storage device 630 and the electronic device 620.

During the identification step, it is required that a connection exists between the hardware-switching device 610 and the electronic device 620, for example, the hardware-switching device 610 and the electronic device 620 are connected by the data storage device 630. In this case, the hardware-switching device 610 may read, through a USB controller 612, the device identification information 632 in the data storage device 630, so that the hardware-switching device 610 may identify which electronic device is connected thereto based on the device identification information 632.

In this case, the data center manager may determine, based on the device identification information, whether the electronic device being currently operated is the electronic device expected to be controlled. If so, the data center manager may control the electronic device by using a peripheral device (for example, a keyboard, a mouse and a display) of the hardware-switching device 610. Otherwise, the data center manager may press a switching button in the hardware-switching device 610 to take the next interface of the hardware-switching device 610 and switch it to an "activated" state, and further check device identification information of an electronic device connected to the "activated" interface.

In an embodiment of the present invention, a method for identifying multiple electronic devices is provided. The method comprises providing a corresponding data storage device operable to communicate with a hardware-switching device for each electronic device among multiple electronic devices. The method further comprises storing device identification information related to each electronic device in the corresponding data storage device. Then, in relation to communication between some or all of the data storage devices and the hardware-switching device, the method comprises the hardware-switching device receiving corresponding device identification information from some or all of the data storage devices, so as to assist in identifying a corresponding electronic device based on the device identification information received by the hardware-switching device.

In this embodiment, the hardware-switching device according to the present invention may have multiple interfaces, and each interface may be connected to a corresponding electronic device through a data storage device. Therefore, in this case, the hardware-switching device may be simultaneously connected to multiple electronic devices, and the hardware-switching device may identify an electronic device by using device identification information stored in each data storage device, and further control the identified electronic device.

Figure 7:
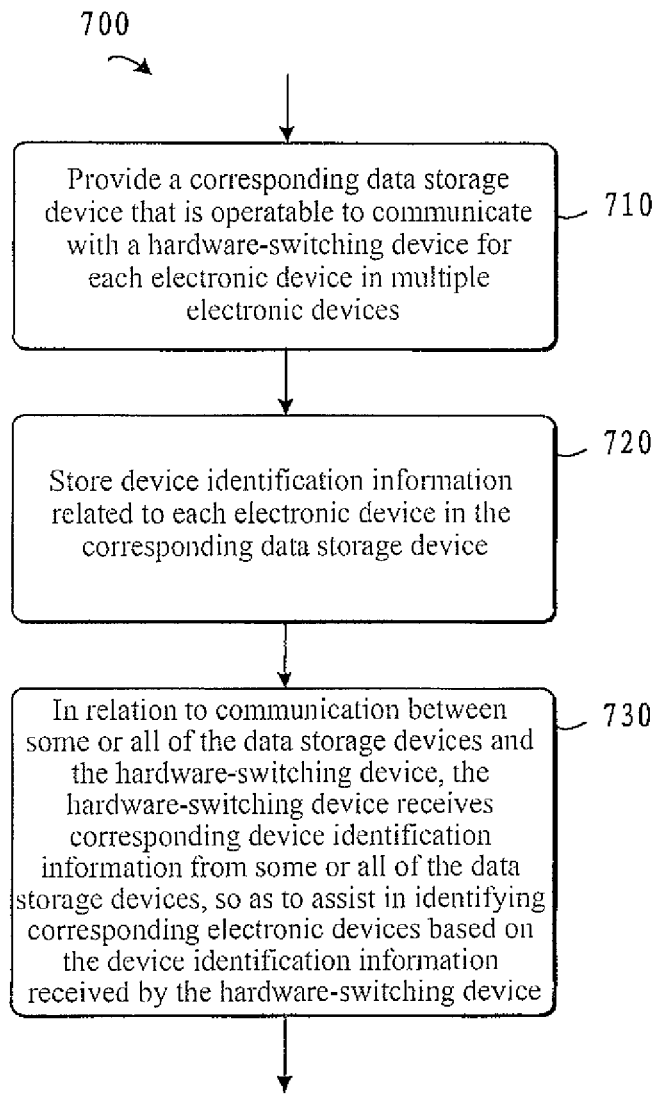
FIG. 7 is a flow chart of a method for identifying multiple electronic devices according to an embodiment of the present invention.

FIG. 7 is a flow chart of a method 700 for identifying multiple electronic devices according to an embodiment of the present invention. First, in step 710, a corresponding data storage device that is operable to communicate with a hardware-switching device is provided for each electronic device in the multiple electronic devices. In this step, the data storage device may be the above-mentioned data storage device with reference to FIG. 4, and the first data interface 434 in the data storage device shown in FIG. 4 may be connected to a corresponding interface of the electronic device.

Then, in step 720, device identification information related to each electronic device is stored in the corresponding data storage device. In this case, the electronic device may write the device identification information of the electronic device into the data storage device.

In step 730, in relation to communication between some or all of the data storage devices and the hardware-switching device, the hardware-switching device receives corresponding device identification information from some or all of the data storage devices, so as to assist in identifying corresponding electronic devices based on the device identification information received by the hardware-switching device.

In this step, one or more data storage devices may be connected to the hardware-switching device, a switching button in the hardware-switching device may be used to switch a currently "activated" interface, and corresponding device identification information may be read from the data storage device connected to the "activated" interface, so as to identify an electronic device connected to another interface of the data storage device.

An embodiment of the present invention further comprises connecting a first data interface of the data storage device to one electronic device among all of the electronic devices for communication, and connecting a second data interface of the data storage device to the hardware-switching device for communication. In this embodiment, the hardware-switching device, the data storage device and the electronic device may be connected in series.

A person skilled in the art should understand that, the data storage device may be embedded into the electronic device and serve as a part of the electronic device, and in this case, a connection between the data storage device and the electronic device may become an internal cable or connection of the electronic device. Alternatively, the data storage device may be embedded into the hardware-switching device and serve as a part of the hardware-switching device, and in this case, a connection between the hardware-switching device and the electronic device may become an internal cable or connection of the hardware-switching device.

An embodiment of the present invention further comprises controlling the identified electronic device through the hardware-switching device. Further, after the hardware-switching device has acquired the device identification information of the electronic device, the electronic device may further be controlled by using a keyboard, a mouse and a display coupled to the hardware-switching device.

Specifically, in this case, information displayed on the display coupled to the hardware-switching device may be data from a video output port of the identified electronic device, and information input at the keyboard and the mouse coupled to the hardware-switching device may be respectively input to a keyboard input port and a mouse input port of the identified electronic device.

It should be noted that the types of peripheral devices connected to the hardware-switching device are not limited in the embodiments of the present invention, and a person skilled in the art may connect various peripheral devices to the hardware-switching device so as to control the identified electronic device. For example, a person skilled in the art may connect an input device such as a tablet, a joystick and a trackball to the hardware-switching device so as to control the identified electronic device.

In an embodiment of the present invention, the step of storing the device identification information of each electronic device in the corresponding data storage device may be executed in response either the electronic device being started or the device identification information of the electronic device being updated. In the above, specific details of how to store the device identification information are disclosed in reference to the embodiments of the data storage device.

In an embodiment of the present invention, the device identification information involving each electronic device comprises system information of the electronic device, and the system information comprises at least one of the following: a system name, a product name, a system type, a serial number, and an IP address. In an embodiment of the present invention, the device identification information involving each electronic device further comprises information of an operating system installed in the electronic device, and the information of the operating system comprises at least one of the following: a name of the operating system, a version of the operating system, a level name of an operating system, and an IP address of an operating system level. The specific content of the device identification information has been described with the above-mentioned reference to FIG. 5, and will not be repeated hereafter.

When the electronic device is started or the device identification information of the electronic device is modified or updated, the electronic device may write the device identification information related to the electronic device into the memory of the data storage device. When the electronic device is connected to an "activated" interface of the KVM switch, the KVM switch may obtain detailed information of the electronic device being currently connected to the "activated" interface based on the device identification information in the memory, thereby identifying the electronic device connected to the "activated" interface.

According to various embodiments of the present invention, it is not necessary to significantly change hardware connection relation between a server in an existing data center and a KVM switch, but it is merely needed to insert a data storage device for identifying electronic devices according to the present invention between the server and a cable connecting the server and the KVM switch. Furthermore, manufacturers of the server and the KVM switch may further integrate the data storage device according to the present invention inside the server or the switch, so as to store device identification information of the connected electronic device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage medium (including forms referred to as volatile memory) is, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored as non-transitory program instructions in a computer readable storage medium that can direct a computer, other programmable data processing apparatus, or other devices to function in a particular manner, such that the program instructions stored in the computer readable storage medium produce an article of manufacture including non-transitory program instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A data storage device for storing device identification information related to an electronic device, the data storage device comprising:
    a memory for storing the device identification information, wherein the data storage device is operable to communicate with an electronic device to receive the device identification information sent from the electronic device and to store the device identification information in the memory, and wherein the data storage device is operable to communicate with a hardware-switching device so that the hardware-switching device receives the device identification information from the memory.

2. The data storage device of claim 1, further comprising:
    a first data interface and a second data interface, wherein the first data interface is operable to be connected to the electronic device for communication, and the second data interface is operable to be connected to the hardware-switching device for communication.

3. The data storage device of claim 2, wherein the memory is non-volatile memory.

4. The data storage device of claim 3, wherein the first data interface and the second data interfaces are universal serial bus interfaces.

5. The data storage device of claim 4, further comprising:
    a universal serial bus communication device class device coupled between the first data interface and the second data interfaces.

6. The data storage device of claim 1, wherein the memory is operable to store the device identification information in response to starting the electronic device or updating the device identification information of the electronic device.

7. An electronic device, comprising:
a data storage device including a memory for storing device identification information related to the electronic device, wherein the data storage device is operable to communicate with the electronic device to receive the device identification information and to store the device identification information in the memory, and wherein the data storage device is operable to communicate with a hardware-switching device so that the hardware-switching device receives the device identification information from the memory; and
a controller operable to write the device identification information related to the electronic device into the memory of the data storage device.

8. The electronic device of claim 7, wherein the data storage device comprises a first data interface, and wherein the electronic device includes a corresponding data interface connected to the first data interface and configured for communication with the first data interface.

9. The electronic device of claim 8, wherein the first data interface of the data storage device and the corresponding data interface of the electronic device are universal serial bus interfaces, and wherein the controller is a universal serial bus controller.

10. The electronic device of claim 7, wherein the device identification information includes system information of the electronic device, wherein the system information is selected from a system name, a product name, a system type, a serial number, an IP address, and combinations thereof.

11. The electronic device of claim 10, wherein the device identification information further includes information of an operating system installed in the electronic device, wherein the information of the operating system is selected from a name of the operating system, a version of the operating system, a level name of the operating system, an IP address of the operating system level, and combinations thereof.

12. The electronic device of claim 7, wherein the electronic device is a server.

13. A hardware-switching device, comprising:
a controller; and
a plurality of data storage devices operable to communicate with the controller, each data storage device including a memory for storing device identification information related to a corresponding electronic device coupled to the data storage device, wherein each data storage device is operable to communicate with the corresponding electronic device to receive the device identification information sent from the corresponding electronic device and to store the device identification information in the memory, and wherein each data storage device is operable to communicate with the controller so that the controller receives the device identification information from the memory to identify an electronic device communicating with each data storage device.

14. The hardware-switching device of claim 13, further comprising:
a corresponding data interface connected to a second data interface of the data storage device and configured for communication with the data storage device.

15. The hardware-switching device of claim 13, wherein the data storage device is operable to store the device identification information in response to starting the electronic device or updating the device identification information of the electronic device.

16. The hardware-switching device of claim 13, wherein the device identification information includes system information of the electronic device, wherein the system information is selected from a system name, a product name, a system type, a serial number, an IP address, and combinations thereof.

17. The hardware-switching device of claim 16, wherein the device identification information further includes information of an operating system installed in the electronic device, wherein the information of the operating system is selected from a name of the operating system, a version of the operating system, a level name of an operating system, an IP address of the operating system level, and combinations thereof.

18. The hardware-switching device of claim 13, wherein the controller is operable to control a selected one of the electronic devices.

19. The hardware-switching device of claim 13, wherein the hardware-switching device is a keyboard video mouse switch.

20. The hardware-switching device of claim 13, wherein the hardware-switching device stores a data table identifying a plurality of connection relations, each connection relation identifying an interface and an electronic device coupled to the interface.

* * * * *